Jan. 12, 1965     T. C. HOLKA     3,165,163
BATTERY MOUNTING DEVICE

Filed May 24, 1962     3 Sheets-Sheet 1

THOMAS C. HOLKA
INVENTOR

BY John R. Faulkner
John J. Roethel
ATTORNEYS

Jan. 12, 1965 T. C. HOLKA 3,165,163
BATTERY MOUNTING DEVICE
Filed May 24, 1962 3 Sheets-Sheet 2

THOMAS C. HOLKA
INVENTOR.

BY John R. Faulkner
John J. Roethel
ATTORNEYS

THOMAS C. HOLKA
INVENTOR

United States Patent Office 3,165,163
Patented Jan. 12, 1965

3,165,163
BATTERY MOUNTING DEVICE
Thomas C. Holka, Detroit, Mich., assignor to Ford Motor Company, Dearborn, Mich., a corporation of Delaware
Filed May 24, 1962, Ser. No. 197,534
9 Claims. (Cl. 180—68.5)

The present invention relates to a storage battery supporting and retaining structure and more particularly to a battery case support structure incorporating a bottom hold-down means.

In the past, many vehicular storage batteries were supported on trays and were restrained against displacement from the tray by a clamping member exerting hold-down pressure at the upper peripheral edge of the battery case through bolt means attached to the tray. This type of clamping member had the disadvantage in that it was exposed to the accumulation of corrosive deposits due to acid seepage and corrosive vapors emanating from the battery. To overcome this disadvantage, the trend in the automotive industry in recent years has been toward the use of bottom hold-down devices which apply hold-down pressure at selected places of engagement near the bottom of the battery case. The lower portion of the battery case is substantially structurally stronger than the sealed over opening at the top of the battery as it is integrally molded with the entire battery case body.

Present conventional bottom hold-down devices have clamping members which engage ribs extending on the end of the battery case and are adjacent and parallel with the bottom thereof. The clamping members are held in a clamping position by threaded devices attached to the battery tray. To adjust or remove the clamping member, it is necessary to loosen the threaded devices which are usually positioned in a relatively inaccessible area between the battery case and the fender apron in the engine compartment of the motor vehicle. Threaded devices require tools for removal and replacement, are subject to thread stripping and also to loss or misplacement of the pieces when removed.

This invention overcomes some of the disadvantages of conventional battery support and retaining structures currently in use by providing a battery mounting device comprising, in combination, a battery case having clamping means engageable surfaces at each end, a battery support platform or tray having means to engage one of the engageable surfaces on one end of the battery case to hold down the one end thereof, and quick-acting clamp means engageable with the engageable surface at the other end of the battery case to complete the retention of the latter on the tray.

In one preferred embodiment of this invention, the battery case is provided with ribs at each end thereof which are adjacent and substantially parallel with the bottom of the battery case. The battery support tray has a flange affixed to one end which engages one of the ribs at one end of the battery case. A rodlike clamping member is provided which has a rib engaging means at one end, a hook at the other end and a fulcruming means intermediate the ends. This clamping member is selectively positionable on the support tray so that the rib engaging means applies hold-down pressure on a rib at the other end of the battery case upon the clamping member being held in a fulcrumed position by the engagement of its hook with the support tray.

The present invention provides a low-cost battery support structure which is readily adjustable to fit a variety of sizes of battery cases provided with extensions or other clamping means engageable surfaces. The invention further provides a battery mounting device which applies hold-down pressure near the bottom of the battery case to improve the life of the battery and reduce the corrosion of the clamping means, thereby permitting its reuse. And further, the clamping member for the bottom battery mounting device is readily adjustable and easily installed without requiring any tools to adjust or tighten the clamping member.

Other advantages and features of the present invention will be made more apparent as this description proceeds, particularly when considered in connection with the accompanying drawings, wherein.

Figure 1:
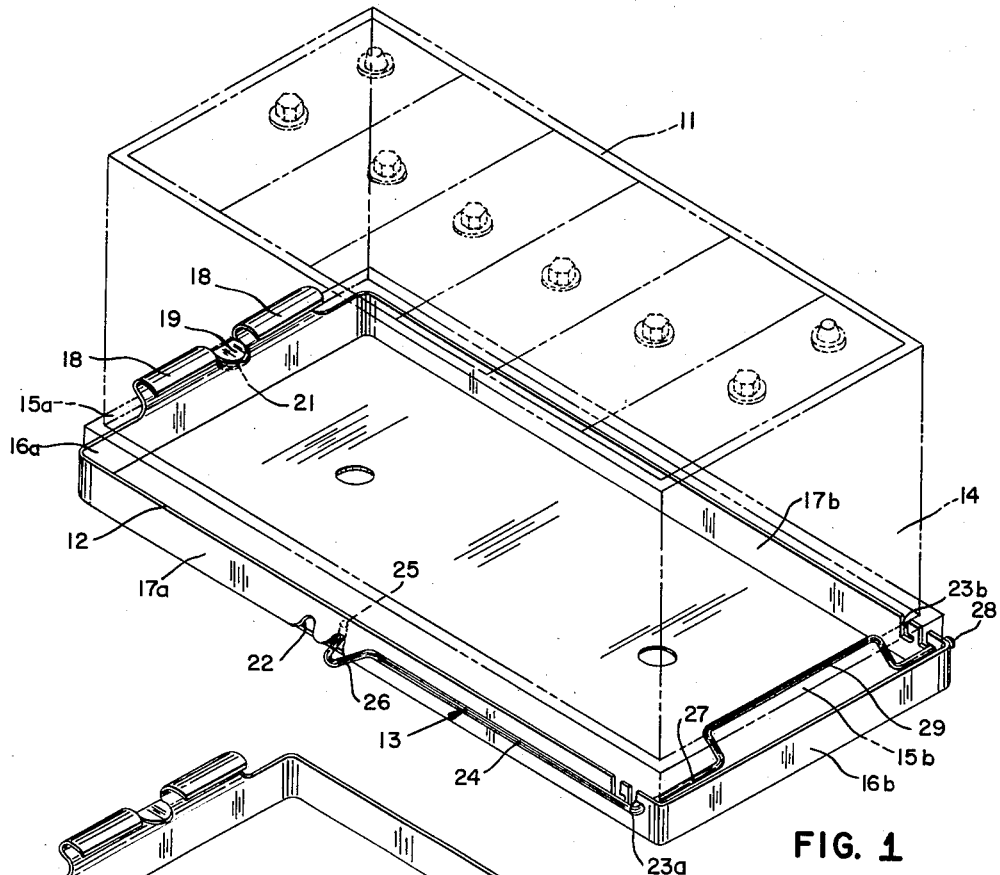
FIGURE 1 is a perspective view of a battery case shown in dot-and-dash lines supported on a battery tray and a clamp means illustrating one embodiment of this invention.

Referring now to the drawings, particularly to FIGURE 1, there is seen a vehicular storage battery, generally designated as 11 and shown in dot-and-dash lines, a battery support platform or tray 12, and a clamping member 13.

The battery 11 comprises a conventional rectangular-shaped battery case 14 except that it is provided at each end with outwardly projecting ribs 15a and 15b, respectively, each of which is adjacent to and substantially parallel with the bottom of the battery case 14. The ribs 15a and 15b may comprise portions of a single rib which completely extends around the entire periphery of the battery case 14 as shown and may be integrally formed with the lower portion of the battery case 14 if desired.

The battery support tray 12, which is preferably a sheet metal stamping, is substantially rectangular in shape and provided with vertically extending end walls 16a and 16b and side walls 17a and 17b. The tray 12 may be affixed to a suitable bracket (not shown) mounted to a structural member of the vehicle body in the vehicle engine compartment.

Figure 2:
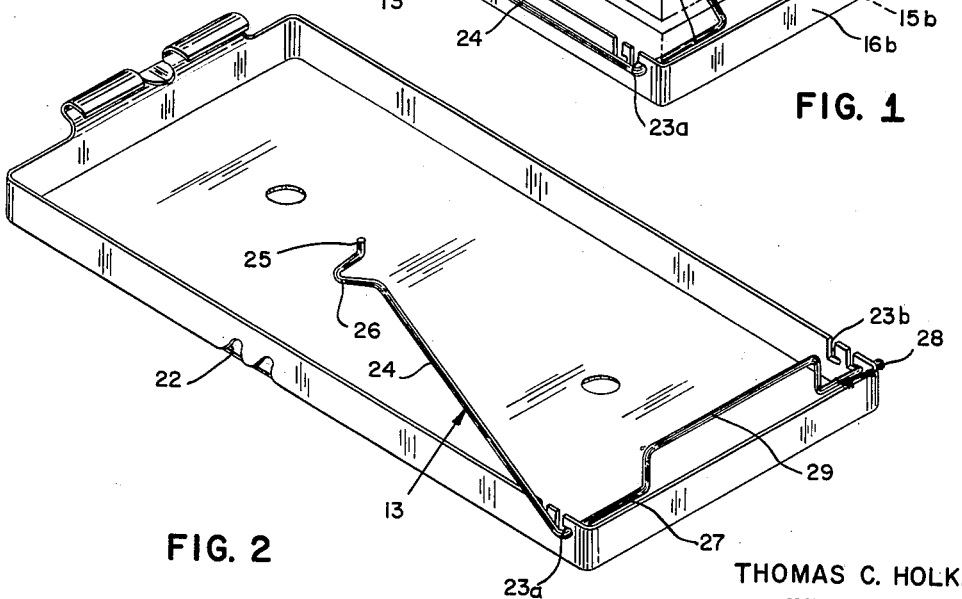
FIGURE 2 is a perspective view of the bottom tray and spring clamp means of the embodiment shown in FIGURE 1 with the battery case removed and the clamp means in a nonclamping position.

As seen in FIGURES 1 and 2, the tray 12 is provided at one end with end wall 16a terminating in two spaced inwardly turned lips 18 which are adapted to project over the rib 15a at one end of the battery case 14 when the latter is positioned on the tray 12. Intermediate the two inwardly turned lips 18, the end wall 16a is provided with an inwardly turned semicylindrical tongue 19. This tongue 19 may be slightly below the level of the lips 18 and is adapted to enter a notch or recess 21 in the lower portion of the battery case 14. This tongue 19 is effective to center the battery case 14 and to retain the end of the battery 11 against lateral displacement relative to the tray 12.

One side wall 17a of the tray is provided with a plurality of hook receiving means which, in this instance, consists of inverted V-shaped openings 22 adjacent the bottom of the tray 12. A plurality of L-shaped notches 23a and 23b are provided in both side walls 17a and 17b respectively at the other end of the battery tray 12 adjacent to the end wall 16b. The vertically extending leg of the notch 23 is open at the top edge of the side walls 17.

The clamping member 13 is fabricated from steel rod stock and comprises a longitudinally extending segment 24 with an upwardly extending hook 25 at one end and an outwardly extending grip segment 26 adjacent to the hook 25. At the other end of the longitudinally extending segment 24, the rodlike spring member is bent approximately 90 degrees to form a lateral segment 27 which extends for the entire width of the tray 12. The lateral segment 27 terminates in a horizontally extending hook 28. Intermediate the ends of the lateral segment 27 the rod is shaped to form an upwardly extending offset 29 which serves as a rib engaging means to cooperate with rib 15b at the other end of the battery case 14.

As can be seen in FIGURE 2, one end of the lateral segment 27 of the rodlike spring member 13 is inserted in one notch 23a on one side wall 17a of the tray 12 while the other end is inserted in the corresponding notch 23b at the other side wall 17b so that both ends are retained in the horizontally extending legs of notches 23a and 23b respectively. When the longitudinally extending segment 24 is positioned in an upward direction as seen in FIGURE 2 so that it is substantially diagonal with the bottom of the tray 12, the rib engaging means of the lateral segment 27 is in a generally vertical position so that the battery case 14 may be received by the tray 12 without interference with the rodlike spring member 13. This spring member 13 is retained in the tray 12 by the notches 23a and 23b and by the hook 28 extending longitudinally of the tray 12.

After the battery case 14 is placed on the tray 12, it is pushed longitudinally in the direction of the end wall 16a until the lips 18 and the tongue 19 fully engage the rib 15a and the notch 21 respectively at one end of the battery case 14. Then the clamping member 13 is manually rotated by exerting a downward pressure on the grip segment 26. This will cause the offset 29 serving as a rib engaging means to pivot about a laterally extending axis, corresponding with the center axis of the lateral segment 27 in this instance, until hold-down pressure on the rib 15b at the opposite end of the battery case 14 is applied. The clamping member 13 is torsionally maintained in its fulcrumed position with the offset 29 engaging the rib 15b at the other end of the battery case by insertion of the hook 25 in one of the V-shaped openings 22 as seen in FIGURE 1.

Figure 3:
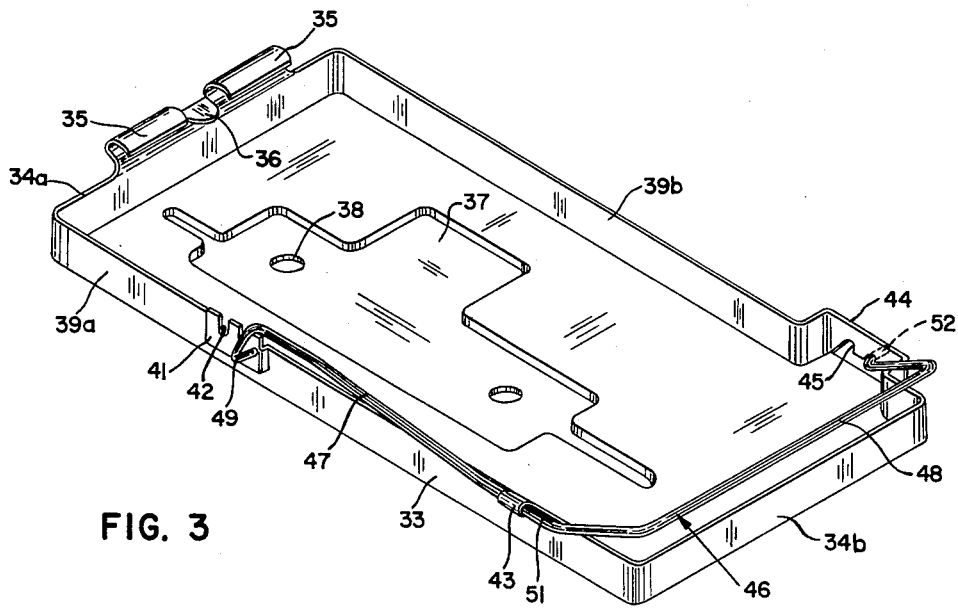
FIGURE 3 is a perspective view of a battery mounting device depicting a second embodiment of this invention with the clamp means in a nonclamping position.
Figure 4:
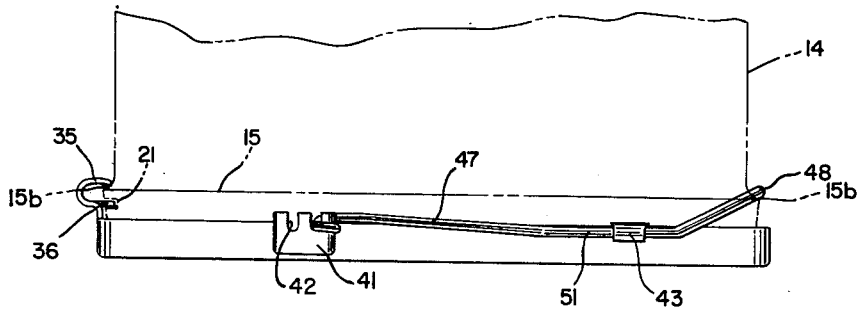
FIGURE 4 is a side elevational view of the embodiment shown in FIGURE 3 showing the lower portion of the battery case in dot-and-dash lines, the support tray, and the clamp means securing the battery case to the tray.

In FIGURES 3 and 4 a second embodiment of this invention is shown. A tray 33 is provided with two end wall sections 34a and 34b with one end wall 34a having two inwardly projecting lips 35 and a tongue 36 intermediate the lips 35 similar to the embodiment shown in FIGURES 1 and 2. This tray 33 is provided with a generally T-shaped depression 37 having drain holes 38. The depression 37 serves as a reinforcing structure and as a drain surface. Also the holes 38 may be utilized in the mounting of the tray 33 to the motor vehicle structure. It will be understood that the depression 37 may also be applied to trays shown in the other embodiments of this invention if desired.

The tray 33 has two side wall sections 39a and 39b with one side wall 39a being provided with a reinforcing plate 41. This reinforcing plate 41 has a plurality of notches 42 which extend downwardly from the top edge thereof. The same side wall 39a has an outwardly projecting lip 43 generally arcuate shaped when viewed in profile intermediate the reinforcing plate 41 and end wall 34b of the tray 33. The side wall 39b is provided with an offset 44 at the other end of the battery tray 33 adjacent end wall 34b as seen in FIGURE 3. This offset 44 extends outwardly and beyond the bottom surface of the tray 33. The outwardly facing side of this offset 44 is provided with a plurality of notches 45 extending upwardly from its bottom edge.

As seen in FIGURE 3, a clamping member 46 is provided which comprises a generally longitudinally extending segment 47 integrally formed with a generally laterally extending segment 48. At the end of the longitudinally extending segment 47 is seen an outwardly projecting hook portion 49. The longitudinal segment 47 extends in a diagonal and downward direction from the hook portion 49 before it is bent to form a substantially longitudinal portion 51. From the end of the longitudinal portion 51 it continues in a diagonally upward direction where it is integrally formed with the lateral segment 48. The terminal end portion of the lateral segment 48 extends diagonally downwardly before terminating in an outwardly projecting hook 52.

The longitudinal portion 51 of the longitudinal segment 47 is engaged on the underside of the projecting lip 43 which serves as a fulcruming means for the rodlike spring member 46. The hook 52 is inserted in one of the notches 45 to secure the terminal end portion of the lateral segment 48 to the tray 33. When the hook portion 49 of the longitudinal segment 47 is disengaged as seen in FIGURE 3, the battery tray 33 is ready to receive a battery case having a configuration similar to the battery case shown in FIGURE 1. As seen in FIGURE 4, the battery case 14 is placed in the tray 33 and longitudinally pushed into position so that the lip 35 and tongue 36 engage rib 15a and notch 21 respectively at the other end of the battery case 14 as heretofore discussed.

Upon rotation of the longitudinal segment 47 in a counterclockwise direction, the lateral segment 48 engages rib 15b at the other end of the battery case 14. Hold-down pressure by the lateral segment 48 is maintained by the frictional engagement of the hook portion 49 with one of the notches. The lip 43 acts as a fulcruming means for the clamping member 46. It can be seen that the spring member 46 is selectively positionable to retain battery cases 14 of different sizes by positioning the hook portion 49 in another notch 42 and the hook 52 in a corresponding other notch 45. Sliding engagement of the longitudinal portion 51 with the underside of the lip 43 is maintained to provide a fulcruming means for the repositioned clamping member 46.

Figure 5:
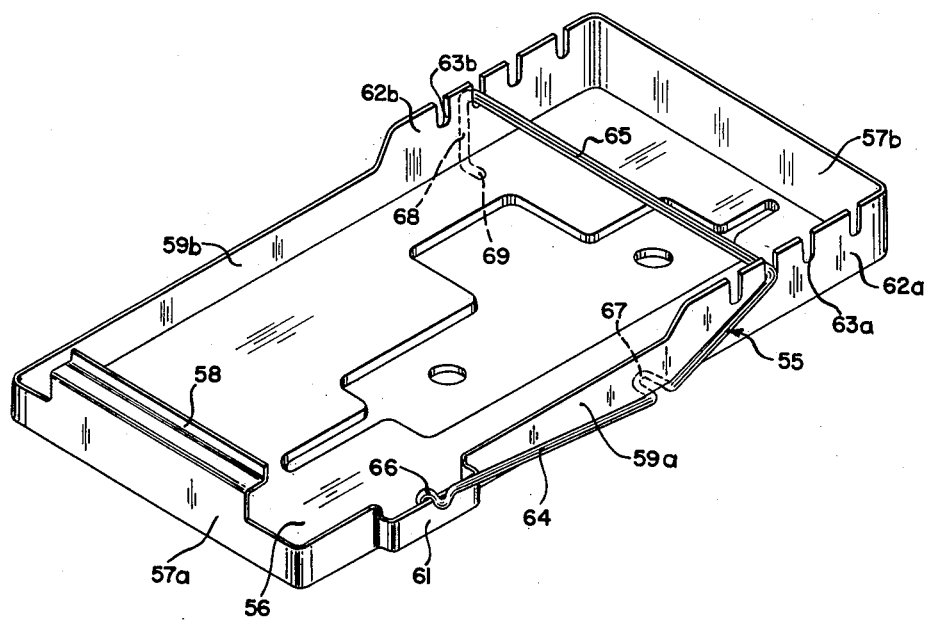
FIGURE 5 is a perspective view of the battery support tray and the clamp means in a clamped position but with the battery case removed to more clearly illustrate a further embodiment of this invention.

In FIGURE 5 is seen a further embodiment of this invention with a clamping member 55 shown in a clamped position but with a battery case removed to more clearly show the structure of the battery mounting device of this embodiment.

A tray 56 is provided with end wall sections 57a and 57b with one end wall 57a having a continuous inwardly projecting flange 58 to hold down one end of the battery case. The tray 56 has two side walls 59a and 59b with one side wall 59a being provided with an integrally formed outwardly extending U-shaped offset 61 adjacent end wall section 57a. Portions 62a and 62b on side walls 59a and 59b adjacent to the end wall 57b extend vertically so that they are approximately double in height in comparison with the remaining portion of the side walls 59. These portions 62a and 62b are provided with a series of vertically extending longitudinally spaced notches 63a and 63b with each notch 63a in one side wall 59a having a corresponding notch 63b in the other side wall 59b. The clamping member 55 cooperates with the tray 56 to provide a clamping means for a battery case (not shown) which is provided with a rib at each end thereof as heretofore discussed.

The clamping member 55 has a longitudinal segment 64 which is integrally formed with a lateral segment 65 at one end and an inwardly extending hook portion 66 at the other end. The longitudinal segment 64 is substantially V-shaped when viewed in side elevation with an inwardly extending loop 67 being formed at its apex. The lateral segment 65 terminates in a downwardly extending terminal portion 68 with an inwardly facing hook 69 at its end to permit anchoring the lateral segment 65 on the bottom of the tray 56.

As can be seen in FIGURE 5, the flange 58 is designed to engage one rib at one end of a battery case. The rodlike clamping member 55 is positioned in the support tray 56 by placing the end portions of the lateral segment 65 in notches 63a and 63b. Also, the loop 67 and the hook 69 are positioned underneath the bottom of the tray 56 at opposite sides thereof. To hold down the battery case, the flange 58 is engaged with one rib at one end of the battery case while the rib engaging portion of the lateral segment 65 applies hold-down pressure on a second rib at the other end of the battery case when the hook portion 66 of the spring member 55 is rotated in a counterclockwise direction. The clamping member 55 is maintained in its fulcrumed position upon the frictional engagement of the hook portion 66 with the edge of the offset 61.

To reposition the clamping member 55 so that the clamping means can be utilized for battery cases of different sizes, the terminal end portion 68 of the lateral segment 65 is pulled outwardly to permit the release of the lateral segment 65 from the notches 63a and 63b. Then the spring member 55 is moved in a longitudinal direction with the loop 67 being maintained in sliding contact with the bottom of the tray until the lateral segment 65 engages a new pair of notches 63. Upon frictional re-engagement of the hook portion 66 with the offset 61, the lateral segment will again apply hold-down pressure on the second rib of the battery case having a different length dimension.

As can be seen from the foregoing description of the various embodiments, the battery mounting device of this invention provides a relatively inexpensive means to retain and secure a battery case 14 provided with projections or ribs 15 at each end thereof. The clamping means is selectively positionable to fit a large variety of battery sizes depending upon its placement on the tray. The clamping member embodying this invention employs simple leverage action to place the clamping member in clamping position and a torsion effect to exert the necessary battery hold-down pressure. The other end of the battery case is maintained in a fixed position by the flange means directly affixed to the tray which forms an integral part of this invention.

Further, the ribs or projections engaged by the clamping member are adjacent to the bottom of the battery case and, therefore, the clamping means of this invention is not exposed to acid seepage or corrosive vapors emanating from the top of the battery.

It will be understood that the invention is not to be limited to the exact construction shown and described but that various changes and modifications may be made without departing from the spirit and scope of the invention as defined in the appended claims.

What is claimed is:

1. A battery mounting device comprising, in combination, a battery case having at least one transversely extending projection at each end thereof, said projections being near the bottom of said battery case, a support tray having at one end thereof an end wall section provided with at least one horizontally extending flange, said flange being engageable with one of said projections to hold down the respective end of said battery case, said support tray having at one side thereof hook receiving means and at least one rod engaging means intermediate said hook receiving means and the other end of said support tray, a second rod engaging means at the other side of said support tray, and a rodlike member having a first segment extending generally longitudinally of said tray and a second segment extending generally transversely of said support tray, said longitudinally extending segment terminating in a hook portion, said generally transversely extending segment being adapted to apply hold-down pressure on the other of said projections at the other end of said battery case upon said transversely extending segment being received by said first and second rod receiving means and said hook portion engaging said hook receiving means.

2. A battery mounting device comprising, in combination, a battery case having at least one transversely extending rib at each end thereof, said ribs being adjacent and substantially parallel to the bottom of said battery case, a generally rectangular support tray having one end wall section provided with at least one flange projecting inwardly, said flange being engageable with one of said ribs at one end of said battery case to hold down said respective end of the latter on said support tray, said support tray having at one side thereof a hook receiving means and at least one rod receiving means intermediate said hook receiving means and the other end of said support tray, said support tray having at least a second rod receiving means at the other side thereof lying on the same transverse axis as said first rod receiving means, and a rodlike member having a first segment extending generally longitudinally and diagonally of said support tray terminating in a hook portion at one end and a second segment extending generally laterally at the other end of said first segment, said laterally extending second segment having a rib engaging portion offset from the axis of said second segment, the end portion of said second segment being received by said first and second rod receiving means on each side of said support tray, said rib engaging portion of said second segment applying hold-down pressure on the other of said ribs at the other end of said battery case upon rotating said first segment into a horizontal plane until said hook portion is received by said hook receiving means on said tray.

3. A battery mounting device comprising, in combination, a battery case having at least one transversely extending rib at each end thereof, said ribs being adjacent and substantially parallel to the bottom of said battery case, a generally rectangular-shaped support tray having one end wall section provided with at least one flange projecting inwardly, said flange being engageable with one of said ribs at one end of said battery case to hold down said respective end of the latter on said support tray, said support tray having at one side thereof a plurality of openings, said support tray also having a plurality of notches intermediate said openings and the other end of said support tray, said support tray also having a plurality of notches at the other side thereof with each of said last-mentioned notches lying on a common axis with the corresponding first-mentioned notches, a rodlike member having a first segment extending generally longitudinally and diagonally of said support tray terminating in a hook portion at one end, a second segment formed integrally with the other end of said first segment and extending generally laterally thereof, said second segment having a rib engaging portion offset from the axis of said laterally extending second segment, the end portions of said second segment being received by said notches at each side of said support tray, said rib engaging portion of said second segment applying hold-down pressure at the other of said ribs at the other end of said battery case upon rotating said first segment into a horizontal plane until said hook portion is received by said one of said openings on said tray.

4. A battery mounting device comprising, in combination, a battery case having a projection at each end and near the bottom thereof, a support tray having at one end thereof an end wall section with at least one flange engageable with one of said projections at one end of the battery case to hold down said respective end, said support tray having at least one hook receiving means at one side thereof intermediate its ends, said support tray also having a lip intermediate said hook receiving means and the other end of said support tray, a second hook receiving means on the other side of said support tray adjacent the other end thereof, a rodlike member having a generally longitudinally extending first segment integrally formed with a second segment extending generally laterally thereof, said first segment terminating in a hook portion, one end of said second segment being received by said second hook receiving means, said rodlike member being constructed and arranged to have said second segment apply hold-down pressure on the other of said projections at the other end of said battery case upon said first segment being fulcrumed about said lip and said hook being engaged by said first hook receiving means upon said tray.

5. A battery mounting device comprising, in combination, a battery case having at least one transversely extending rib at each end, said ribs being adjacent and substantially parallel to the bottom of said battery case, a support tray having at one end thereof an end wall section provided with at least one flange projecting inwardly of said tray, said flange being engageable with one of said ribs at one end of said battery case to hold down the respective end of the latter on said support tray, said support tray having at least one hook receiving means on one side thereof intermediate its ends and a downwardly curving lip intermediate said hook receiving means and the other end of said support tray, at least one hook receiving means on the other side of said support tray adjacent the other end thereof, a rodlike member having a first segment integrally formed with a second segment, said first segment extending generally longitudinally and diagonally with respect to the bottom of said battery tray, said second segment extending generally laterally with respect to said first segment, said second segment intermediate its ends having a rib engaging portion, said first and second segments terminating in a first and second hook means respectively, said second hook means at one end of said second segment being received by said hook receiving means on said other side of said support tray, said first segment intermediate its ends being fulcrumed on the other side of said lip, said rib engaging portion of said second segment applying hold-down pressure on the other of said ribs at the other end of said battery case upon rotation of said first segment until said first hook portion is being engaged by said hook receiving means on said one side of said tray.

6. A battery mounting device comprising, in combination, a battery case having at least one transversely extending rib at each end, said ribs being adjacent and substantially parallel to the bottom of said battery case, a support tray having at one end thereof an end wall section provided with at least one flange projecting inwardly of said tray, said flange being engageable with one of said ribs at one end of said battery case to hold down said respective end of the latter on said support tray, said support tray having at least one hook portion receiving means at one side thereof intermediate its ends and an outwardly extending lip curving downwardly intermediate said hook portion receiving means and the other end of said support tray, at least one hook receiving means on the other side of said support tray adjacent to the other end thereof, a selectively positionable rodlike member comprising a first segment and a generally laterally extending second segment, said second segment having a rib engageable portion, said first segment extending generally longitudinally of said support tray and having a straight center portion with a first and second portion extending diagonally and upwardly from each end of said straight center portion, said first portion of said first segment terminating in an outwardly extending hook portion and said second portion integrally formed with said laterally extending second segment, said laterally extending second segment having a diagonally and downwardly extending end portion terminating in an outwardly extending hook, said hook being received by said hook receiving means on said other side of said support tray and said straight portion being engaged by the underside of said lip, said rib engaging portion of said second segment applying hold-down pressure on the other of said ribs at the other end of said battery case upon said first segment being rotated in a downward direction, said rodlike member being held in a fulcrumed position by engagement of said hook portion with the hook portion receiving means on said one side of said support tray.

7. A battery mounting device comprising, in combination, a battery case having at least one transveresly extending rib at each end, said ribs being adjacent and substantially parallel to the bottom of said battery case, a support tray having at one end thereof an end wall section provided with at least one horizontal flange projecting inwardly of said tray, said flange being engageable with one of said ribs at one end of said battery case to hold down said respective end of the latter on said support tray, said support tray having a plurality of notches extending downwardly from the top edge at one side thereof intermediate its ends, said support tray also having an outwardly extending lip curving downwardly from said one side thereof intermediate the notches and the other end of said support tray, a plurality of notches extending upwardly from the bottom edge on the other side of said support tray adjacent to the other end thereof, a selectively positionable rodlike member comprising a generally longitudinally extending first segment and a second segment extending generally laterally of said first segment, said second segment having a rib engageable portion, said first segment having a substantially straight center portion with a first and second portion extending diagonally and upwardly from each end of said center portion, said first portion terminating in an outwardly extending first hook and said second portion integrally formed with said laterally extending second segment, said laterally extending second segment having a diagonally and downwardly extending end portion terminating in an otuwardly extending second hook, said second hook being received by one of said upwardly extending notches and said center portion of said first segment being slidably engaged by the underside of said lip, said rib engaging portion of said second segment applying hold-down pressure on the other of said ribs at the other end of said battery case upon said first portion of said first segment being rotated in a downward direction, said rodlike member being held in a fulcrumed position upon the frictional engagement of said first hook with one of said downwardly extending notches on said tray.

8. A battery mounting device comprising, in combination, a battery case having a projection near the bottom at each end thereof, a support tray having one end wall section with at least one flange engageable with one of said projections to hold down the respective end of said battery case, said support tray having at least a hook engaging portion at one side and adjacent one end thereof, a first rod receiving means at said one side and adjacent the other end of said support tray, a second rod receiving means at the other side of said support tray laterally spaced from said first rod receiving means, a rodlike member provided with a generally longitudinally extending first segment integrally formed with a generally laterally extending second segment, said first segment terminating in a hook and having a laterally inwardly extending projection intermediate its ends, said laterally extending second segment being received by said first and second rod receiving means, said rodlike member being constructed and arranged to have said second segment apply hold-down pressure on the other of said projections at the other end of said battery case upon the projection intermediate the end of said first segment being fulcrumed on the bottom of said battery case and said hook being frictionally engaged by said hook engaging portion on said tray.

9. A battery mounting device comprising, in combination, a battery case having at least one transversely extending rib at each end thereof, said ribs being adjacent and substantially parallel to the bottom of said battery case, a generally rectangular-shaped support tray having one end wall section provided with a horizontal flange projecting inwardly of said tray, said flange being engageable with one of said ribs to hold down the respective ends of said battery case on said support tray, said support tray having an offset on one side thereof adjacent said end wall section, a plurality of first notches on one side of said tray adjacent the other end wall section, a plurality of second notches laterally spaced from and in axial alignment with said first notches, a selectively positionable rod-like member, said member having a first segment extending generally longitudinally of said support tray formed integrally with a laterally extending second segment, said first segment terminating in an inwardly extending hook portion, said second segment terminating in a terminal end portion with an inwardly extending hook, said first longitudinally extending segment having an inwardly extending loop intermediate its ends, said first segment having a first portion extending diagonally upwardly from said loop to said first portion, and a second portion extending diagonally upwardly from said loop to said laterally extending second segment, the end portions of said second segment being received by a first notch and a corresponding second notch at each side of said support tray, said loop and said hook being brought into engagement with the underside of said tray, said second segment applying hold-down pressure upon the other rib at the other end of said battery case upon rotation of said first portion of said first segment in a counterclockwise direction, said rodlike member being held in a fulcrumed position by the frictional engagement of said first hook portion with said offset.

References Cited in the file of this patent

UNITED STATES PATENTS

| | | |
|---|---|---|
| 1,939,742 | Wanemaker | Dec. 19, 1933 |
| 2,270,563 | Schnebelen | Jan. 20, 1942 |
| 2,398,060 | Van Alstyne | Apr. 9, 1946 |
| 2,947,373 | Wilson | Aug. 2, 1960 |
| 2,980,195 | Herbst | Apr. 18, 1961 |

FOREIGN PATENTS

| | | |
|---|---|---|
| 108,930 | Great Britain | Aug. 30, 1917 |
| 204,465 | Great Britain | Oct. 4, 1923 |